United States Patent
Nishiyama et al.

(10) Patent No.: US 9,842,029 B2
(45) Date of Patent: Dec. 12, 2017

(54) ELECTRONIC DEVICE, METHOD AND STORAGE MEDIUM

(71) Applicant: Kabushiki Kaisha Toshiba, Minato-ku, Tokyo (JP)

(72) Inventors: Kaoru Nishiyama, Tokyo (JP); Fumitoshi Mizutani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 87 days.

(21) Appl. No.: 14/929,918

(22) Filed: Nov. 2, 2015

(65) Prior Publication Data

US 2016/0283146 A1 Sep. 29, 2016

Related U.S. Application Data

(60) Provisional application No. 62/138,252, filed on Mar. 25, 2015.

(51) Int. Cl.
*G06F 11/00* (2006.01)
*G06F 11/14* (2006.01)

(52) U.S. Cl.
CPC .......... *G06F 11/1469* (2013.01); *G06F 11/00* (2013.01); *G06F 11/1451* (2013.01)

(58) Field of Classification Search
CPC .................................................. G06F 11/1469
USPC .......... 714/15, 2, 6.1, 6.12, 6.3, 6.32, 42, 54
See application file for complete search history.

(56) References Cited

U.S. PATENT DOCUMENTS

| | | | | |
|---|---|---|---|---|
| 5,155,845 A | * | 10/1992 | Beal | G06F 11/2058 714/6.12 |
| 5,734,818 A | * | 3/1998 | Kern | G06F 11/2064 714/20 |
| 7,096,379 B2 | * | 8/2006 | Viswanathan | G06F 11/2064 707/999.202 |
| 7,607,037 B1 | * | 10/2009 | LeCrone | G06F 11/2094 714/6.23 |
| 2005/0015407 A1 | * | 1/2005 | Nguyen | G06F 11/2069 |
| 2009/0037432 A1 | | 2/2009 | Kamura et al. | |
| 2013/0173877 A1 | * | 7/2013 | Guo | G06F 11/1456 711/162 |

FOREIGN PATENT DOCUMENTS

| JP | 2009-037318 A | 2/2009 |
|---|---|---|
| JP | 2009-157437 A | 7/2009 |
| JP | 2010-271933 A | 12/2010 |
| JP | 2012-178015 A | 9/2012 |

* cited by examiner

*Primary Examiner* — Dieu-Minh Le
(74) *Attorney, Agent, or Firm* — Knobbe Martens Olson & Bear LLP

(57) ABSTRACT

According to one embodiment, an electronic device includes a receiver and a processing circuit. The receiver is configured to receive first data related to operating statuses of storage from external devices connected through a network. The processing circuit is configured to control the external devices to save data stored in a first area in the storage of a first external device on the storage of each of two or more second external devices based on the first data received by the receiver.

12 Claims, 9 Drawing Sheets

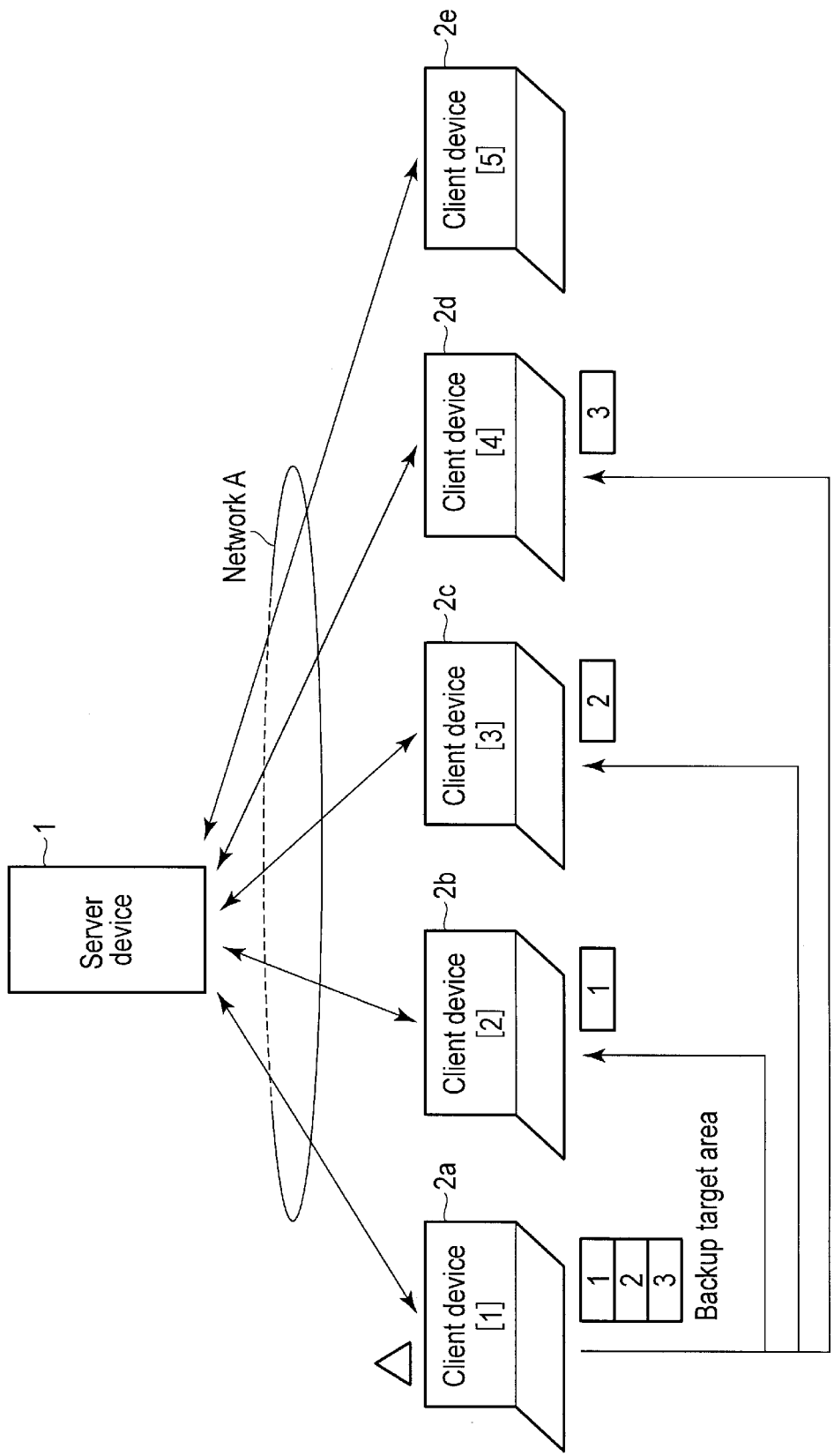
F I G. 1

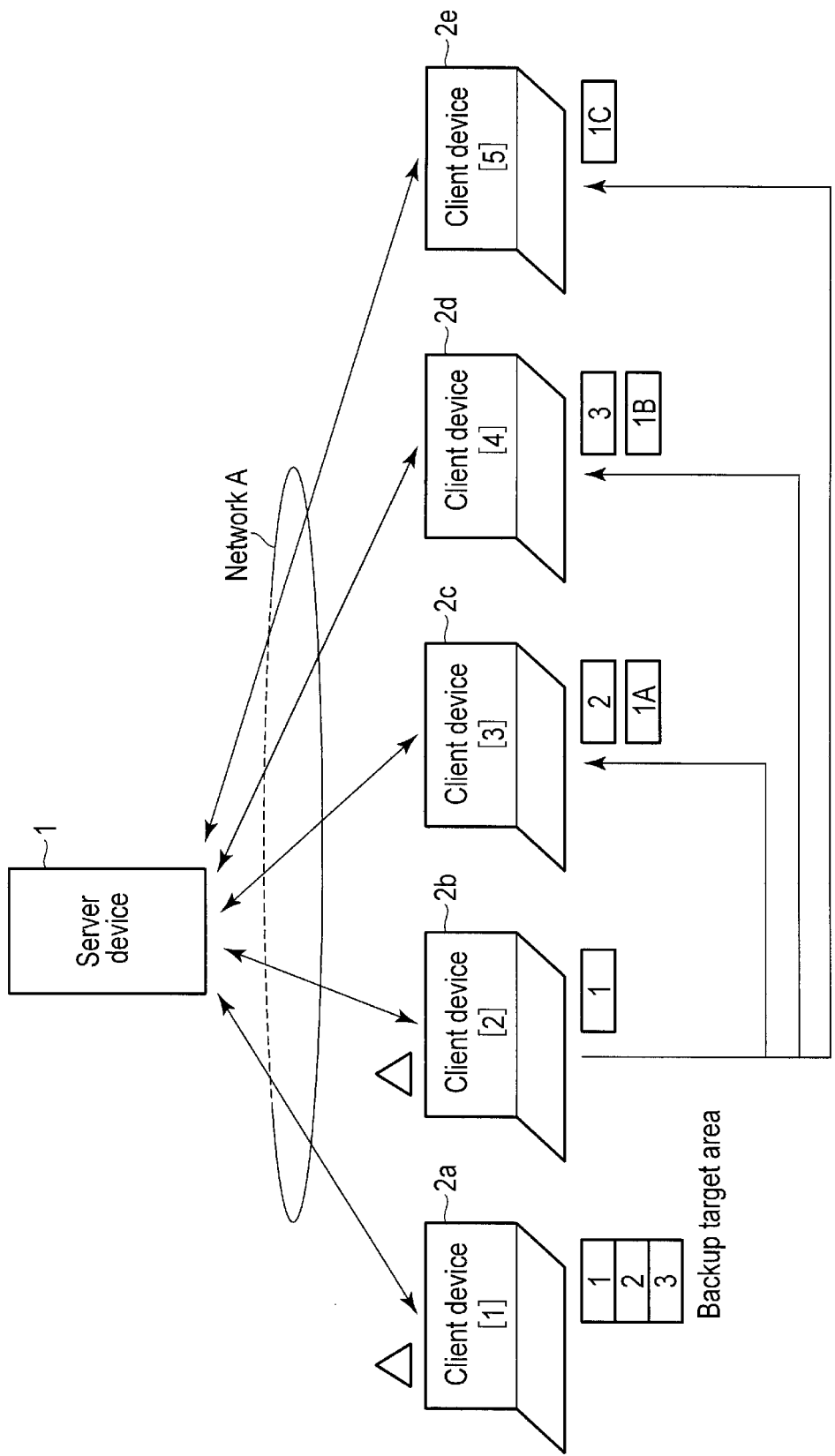
F I G. 2

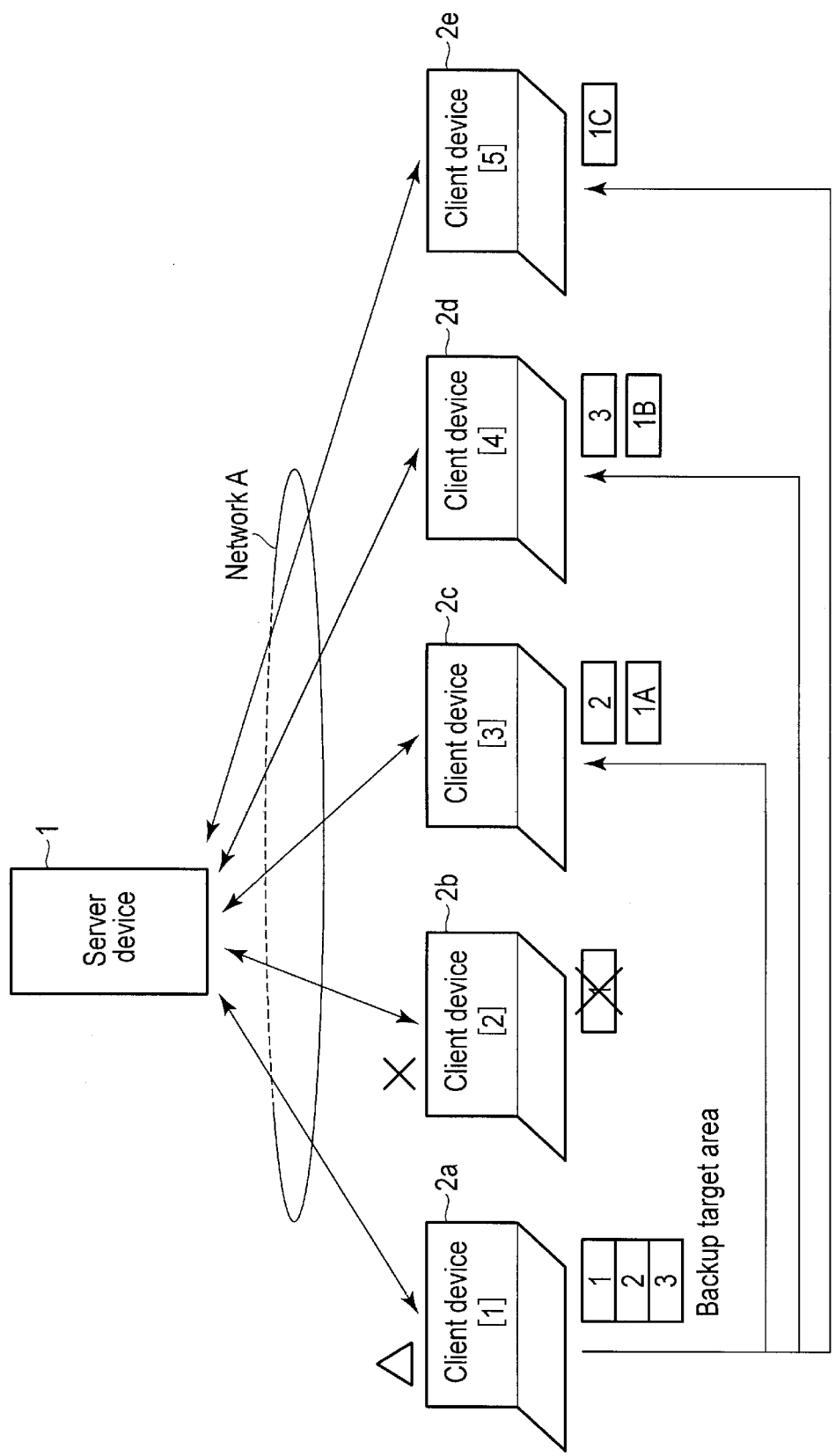
F I G. 3

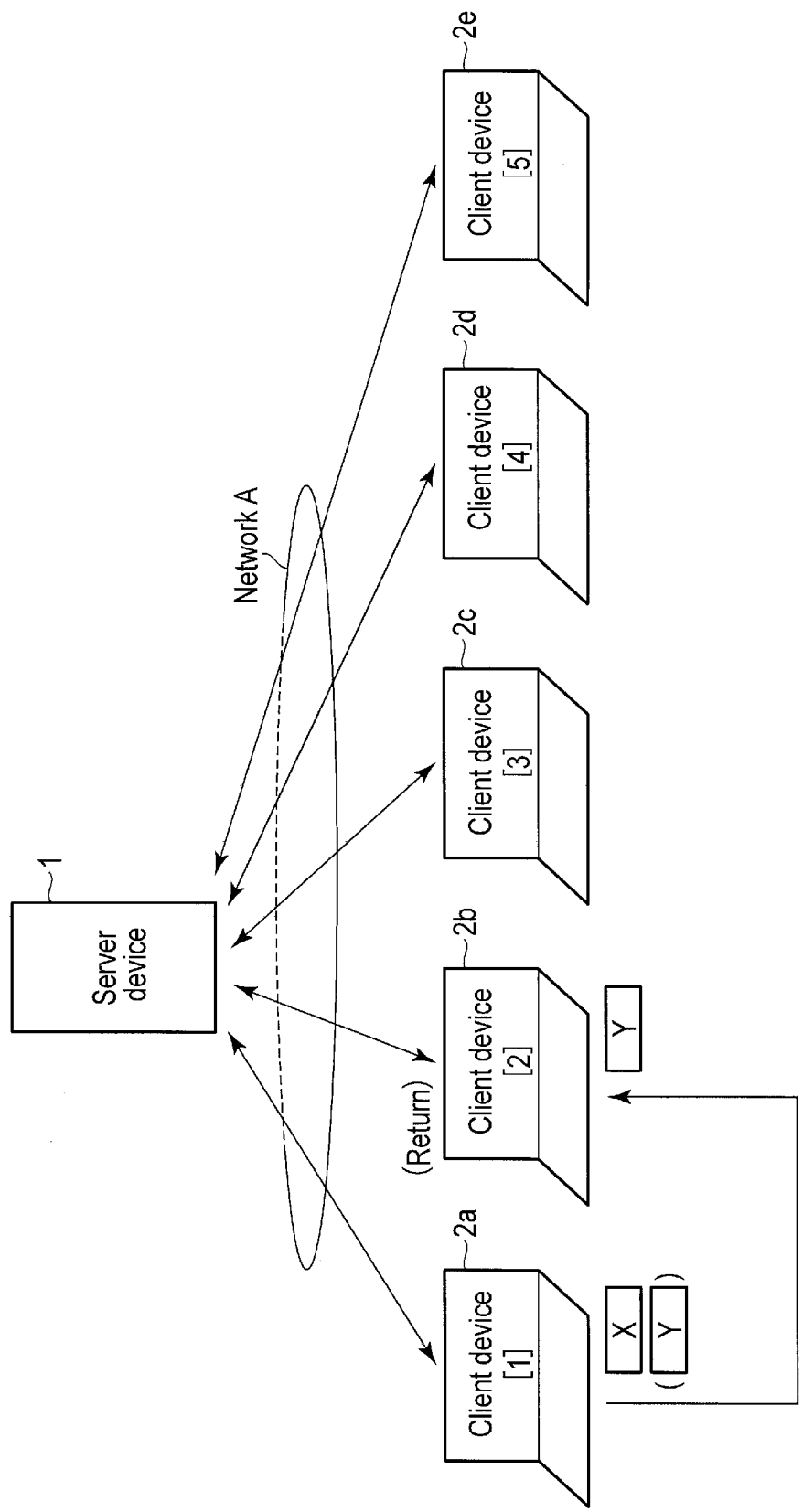
F I G. 4

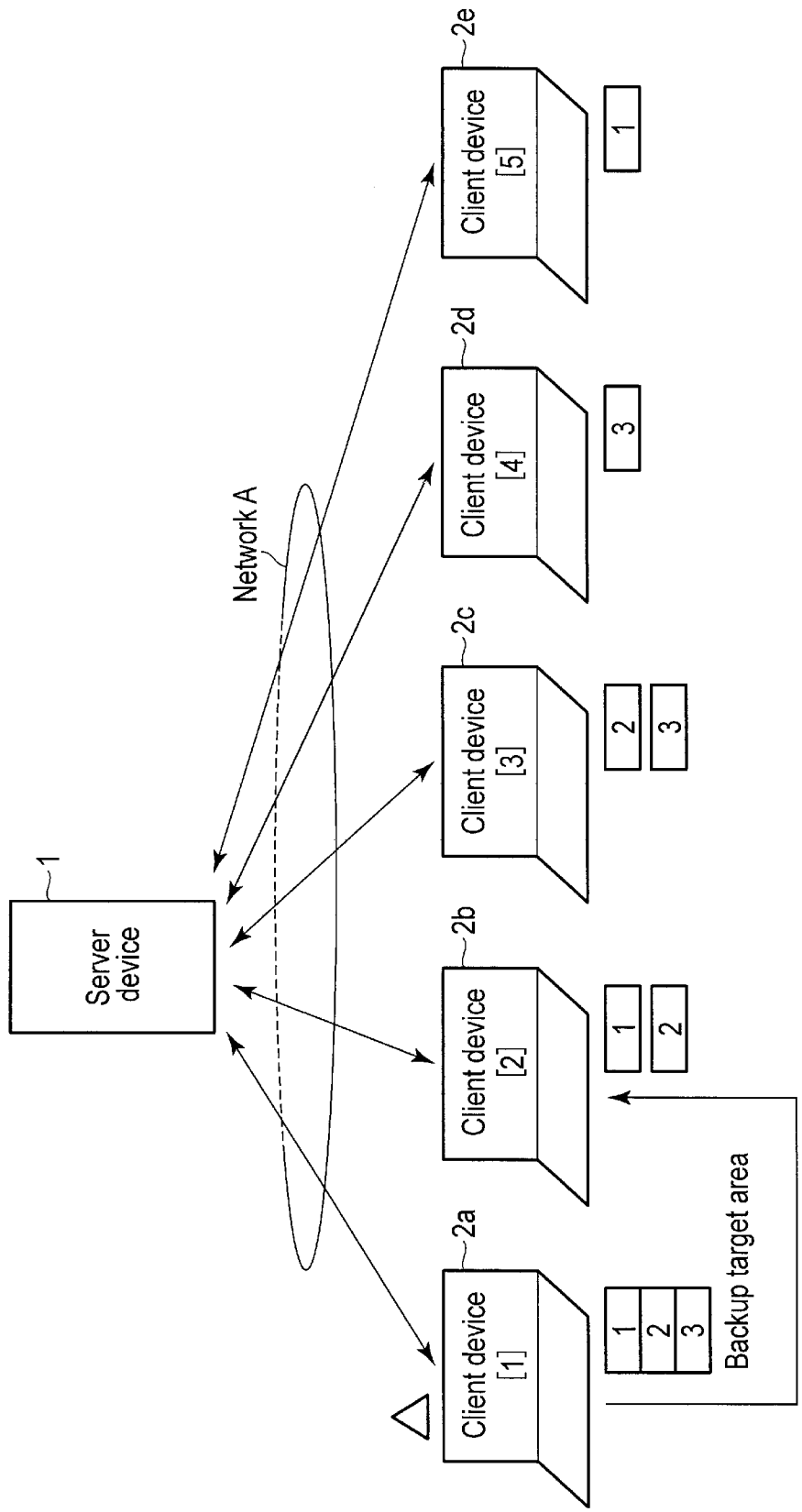
F I G. 10

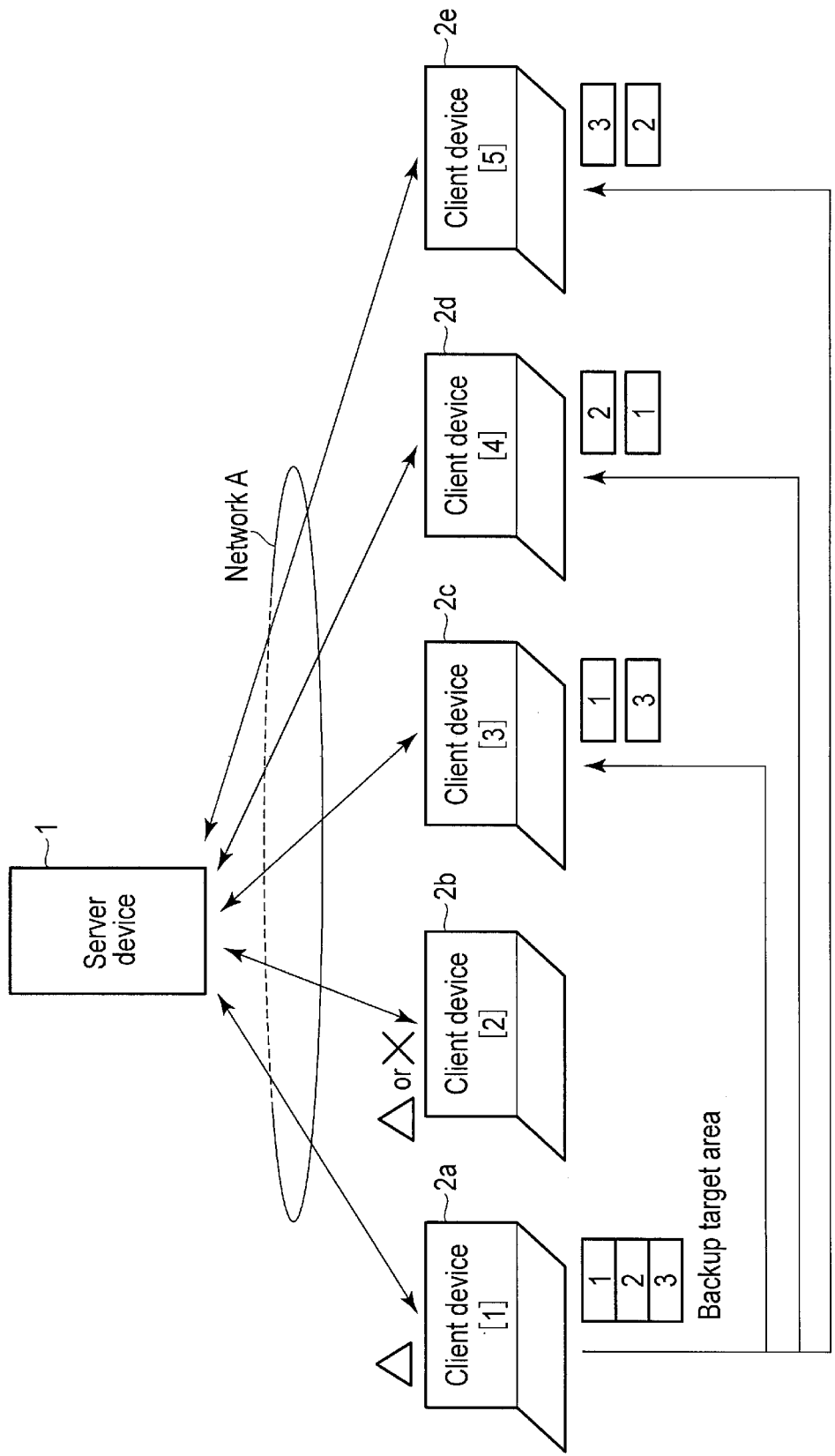
F I G. 11

ELECTRONIC DEVICE, METHOD AND STORAGE MEDIUM

CROSS-REFERENCE TO RELATED APPLICATIONS

This application claims the benefit of U.S. Provisional Application No. 62/138,252, filed Mar. 25, 2015, the entire contents of which are incorporated herein by reference.

FIELD

Embodiments described herein relate generally to an electronic device, a method and a storage medium.

BACKGROUND

In recent years, personal computers (PCs) which employees use for business have been monitored and managed through a network in many companies. One of the items by which the PCs are monitored and managed is to back up data in case of failure of, for example, hard disk drives (HDDs) mounted in the PCs.

If a large number of PCs to be monitored and managed exist, a large-capacity storage server is required. On the other hand, if PCs each communicate with other PCs voluntarily and data is mutually backed up between the PCs to dispense with a storage server, traffic volume on a network increases.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary first illustration for explaining a backup service provided by an electronic device of a first embodiment.

FIG. 2 is an exemplary second illustration for explaining the backup service provided by the electronic device of the first embodiment.

FIG. 3 is an exemplary third illustration for explaining the backup service provided by the electronic device of the first embodiment.

FIG. 4 is an exemplary fourth illustration for explaining the backup service provided by the electronic device of the first embodiment.

FIG. 10 is an exemplary first illustration for explaining an outline of a backup service provided by an electronic device of a second embodiment.

FIG. 11 is an exemplary second illustration for explaining the outline of the backup service provided by the electronic device of the second embodiment.

DETAILED DESCRIPTION

Figure 5:
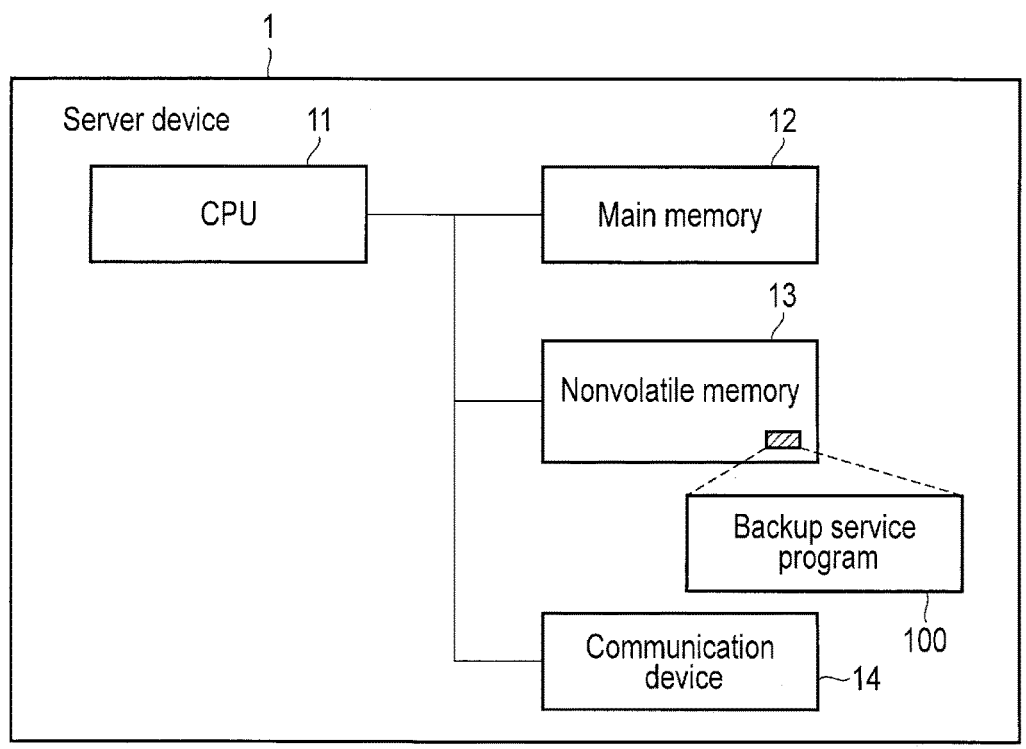
FIG. 5 is an exemplary illustration showing a structure example of the electronic device of the first embodiment.

Various embodiments will be described hereinafter with reference to the accompanying drawings.

In general, according to one embodiment, an electronic device includes a receiver and a processing circuit. The receiver is configured to receive first data related to operating statuses of storage from external devices connected through a network. The processing circuit is configured to control the external devices to save data stored in a first area in the storage of a first external device on the storage of each of two or more second external devices based on the first data received by the receiver.

First Embodiment

A first embodiment will first be described.

An electronic device of the present embodiment is implemented as, for example, a server device which provides a backup service of data in PCs which employees use for business in a company, etc. An outline of the backup service provided by the electronic device of the present embodiment will first be described with reference to FIG. 1, FIG. 2, FIG. 3 and FIG. 4. Here, the electronic device of the present embodiment is referred to as a server device 1, and PCs whose data is backed up by the backup service provided by the electronic device of the present embodiment are referred to as client devices 2. It should be noted that the client devices 2 are plural, and thus may be referred to as a client device 2a, a client device 2b, etc., to be distinguishable from each other. In other words, the client devices 2 are a generic name of the client device 2a, the client device 2b, etc.

As shown in FIG. 1, the server device 1 (which is the electronic device of the present embodiment) is connected to the client devices 2 through a network A. The network A may be the Internet or a local area network (LAN). In addition, the network A may be a combination of the Internet and a LAN.

In the client devices 2, HDDs are contained, and further, client software (programs) is installed. The client software has a function of collecting data (status data) on operating statuses of the HDDs and periodically transmitting the data to the server device 1. The status data includes, for example, the number of accesses, the number of times an error occurs, and the number of times a magnetic head retracts with the detection of a shock. Although not described herein, the client software can collect various items of data on, not only the HDDs, but various components in the client devices 2.

On the other hand, in the server device 1, a backup service program which will be described later is installed. Firstly, the backup service program analyzes status data transmitted from the client devices 2, and detects a symptom of failure of the client devices 2. As the algorithm for detecting a symptom of failure, various algorithms, for example, an algorithm in which the incidence of errors (the number of times an error occurs/the number of accesses) in the last certain period exceeds a reference value, can be applied.

Secondly, if a symptom of failure of an HDD of a certain client device 2 is detected, the backup service program controls the client device 2 whose data is to be backed up and two or more other client devices 2 to be backup destinations respectively to back up data in an area predesignated as a backup target (backup target area) in the HDD to HDDs of the two or more other client devices 2 in a distributed manner.

Here, let us assume the case where the server device 1 (backup service program) detects a symptom of failure of an HDD of the client device 2a. The server device 1 assigns an identification number to each of the client devices 2 for which the backup service is provided. For example, "1" is assigned to the client device 2a as an identification number. In addition, a number incremented by one is assigned to each of the client device 2b and the other client devices 2 as an identification number. The server device 1 logically connects the client devices 2 in order of identification number and logically connects the client device 2 of the largest identification number and the client device 2 of the smallest identification number, regarding the client devices 2 as nodes on a ring.

If a symptom of failure of the HDD of the client device 2a is detected, the server device 1 first divides a backup target area in the HDD into a predetermined number of partial areas. The server device 1 manages which area in the HDD of each of the client devices 2 is designated as a backup target area. In addition, it is herein assumed that data in the backup target area is backed up to other three client devices 2 in a distributed manner. That is, the server device 1 divides a backup target area of an HDD for which a symptom of failure is detected into three partial areas.

The server device 1 then determines client devices 2 to be respective backup destinations of data in the three partial areas. For example, the server device 1 searches the ring in order of identification number from the client device 2a (for which a symptom of failure of the HDD is detected), and finds other three client devices 2 for which a symptom of failure of HDDs is not detected. It is herein assumed that the client devices 2b, 2c, and 2d are determined as the backup destinations as shown in FIG. 1. Then, the server device 1 requests the client device 2a to transmit data to the client devices 2b, 2c, and 2d while requesting the client device 2b, 2c, and 2d to receive and save data transmitted from the client device 2a. Requests to the client device 2a include an instruction on which area's data in the HDD should be transmitted. It is therefore unnecessary for the client devices 2 to be aware of which area in the HDD is designated as a backup target area. The designation of a backup target area, for example, may be carried out in each of the client devices 2 through a user interface provided by the client software and be notified to the server device 1, or may be collectively carried out in the server device 1 through a user interface provided by the backup service program. The server device 1 manages a backup status of data between the client devices 2. That is, the server device 1 performs management so that data in the backup target area in the HDD of the client device 2a is saved on the HDDs of the client devices 2b, 2c, and 2d in a distributed manner. Needless to say, it is also possible to transfer data between the client devices 2 with the server device 1 interposed therebetween instead of directly transmitting and receiving data between the client devices 2.

Next, with reference to FIG. 2, let us assume the case where the server device 1 detects a symptom of failure of the HDD of the client device 2b to which data of the client device 2a is backed up.

As in the case where a symptom of failure of the HDD of the client device 2a is detected, if a symptom of failure of the HDD of the client device 2b is detected, the server device 1 divides a backup target area in the HDD for which a symptom of failure is detected into three partial areas, determines client devices 2 to be respective backup destinations of data in the three partial areas, and backs up the data in the backup target area in a distributed manner. At the same time, the server device 1 also divides data which is backed up (which is herein data of the HDD of the client device 2a and will be hereinafter referred to as backup data) into three, and transfers the divided backup data to the other client devices 2. It should be noted that FIG. 2 shows only the destinations of the backup data of the HDD of the client device 2a.

Next, with reference to FIG. 3, let us assume the case where the server device 1 detects that the client device 2b (for which a symptom of failure of the HDD is not detected) to which the data of the client device 2a is backed up is separated from the network A for a certain period or more.

The server device 1, for example, may search the ring to circularly monitor whether or not the client devices 2 are connected to the network A, or may determine that a client device 2 which ceases to transmit status data is separated from the network A. As described above, the server device 1 manages the backup status of data between the client devices 2, and thus can recognize that data of the client device 2a has been backed up to the client device 2b which is detected being separated from the network A. Then, the server device 1 determines a new backup destination of the data which has been backed up, and causes the client devices 2 to transmit and receive the data to and from each other. At this time, it suffices that the server device 1 regards one of the three partial areas into which the backup target area in the HDD is divided when a symptom of failure of the HDD of the client device 2a is detected, more specifically, a partial area whose data is backed up to the client device 2b, as a backup target area at this time.

In this manner, the server device 1 achieves backing up data of a client device 2 in a distributed manner to two or more other client devices 2 without the need for a large-capacity storage server by a simple algorithm of dividing a backup target area, searching the ring in order of identification number to find backup destinations, and backing up data in the backup target area in a distributed manner. This can be achieved because the server device 1 manages the backup status of data between the client devices 2.

If data in a backup target area in an HDD of a client device 2 is restored to the HDD of the client device 2, it suffices that the server device 1 collects and combines respective items of backup data from other client devices 2 which are backup destinations, and transmits them to the client device 2.

In addition, since a backup process is carried out upon detection of a symptom of failure of an HDD and data is transmitted and received between the client devices 2, traffic volume on the network A does not increase.

Next, with reference to FIG. 4, let us assume the case where the server device 1 detects that a new client device 2 is added to the network A, or detects that a client device 2 which has been separated from the network A returns to the network A. The server device 1, for example, can detect the addition and the return of a client device 2 by a connection request from the client device 2 transmitted through the network A.

Here, the case where that the client device 2b which has been separated from the network A returns to the network A is assumed. It is assumed that a symptom of failure of the HDD of the client device 2a in FIG. 4 is not detected.

Upon detecting the return of the client device 2b to the network A, the server device 1 examines whether or not backup data is saved on, for example, a client device 2 (the client device 2a herein) one before the client device 2b on the ring, of client devices 2 for which a symptom of failure of HDDs are not detected. If the backup data is saved, the server device 1 moves, for example, half the backup data to the client device 2b. More specifically, the server device 1 causes the client devices 2 to transmit and receive data to and from each other.

In this manner, the server device 1 also achieves leveling out a load of backup between the client devices 2 by a simple algorithm based on an identification number of an added or a returning client device 2. This also can be achieved because the server device 1 manages the backup status of data between the client devices 2.

FIG. 5 shows a structure example of the server device 1.

As shown in FIG. 5, the server device 1 comprises a CPU 11, a main memory 12, a nonvolatile memory 13, and a communication device 14.

The CPU 11 is a device for causing the server device 1 to operate variously by loading various programs stored in the nonvolatile memory 13 to the main memory 12 and executing them. One of the various programs executed by the CPU 11 is a backup service program 100. The backup service program 100 is a program for causing the server device 1 to perform a process related to the provision of the above-described backup service. The communication device 14 is a device for communicating with the client devices 2 through the network A.

Figure 6:
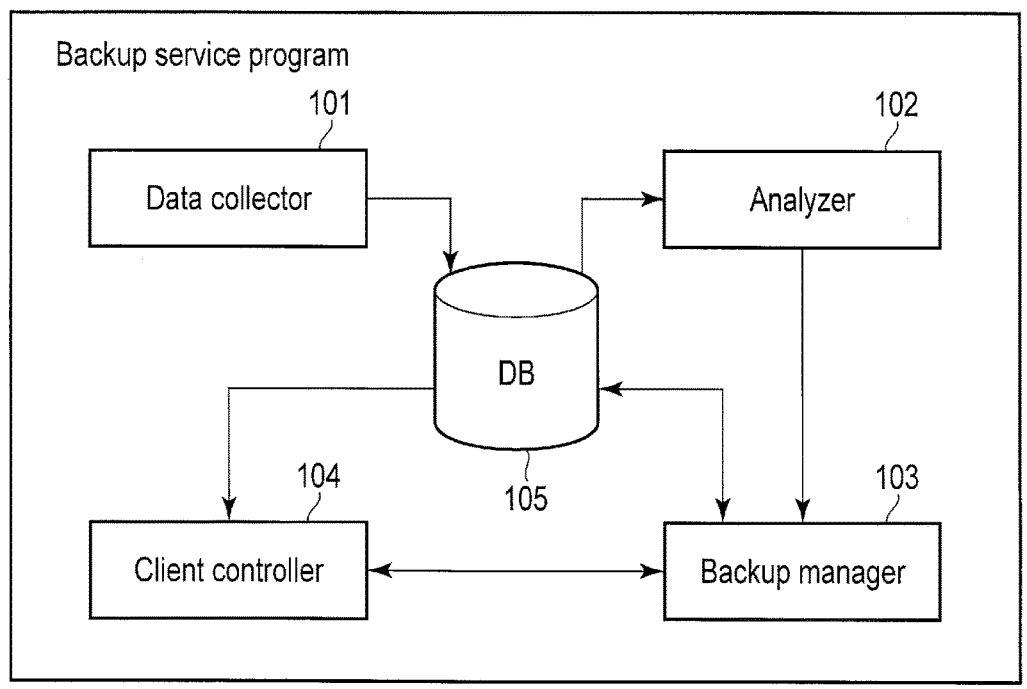
FIG. 6 is an exemplary illustration showing an example of a functional block of a backup service program operating on the electronic device of the first embodiment.

FIG. 6 shows an example of a functional block of the backup service program 100 (operating on the server device 1).

As shown in FIG. 6, the backup service program 100 comprises a data collector 101, an analyzer 102, a backup manager 103, a client controller 104, and a database (DB) 105.

The data collector 101 is a module which receives status data transmitted from the client devices 2 and stores it in the DB 105. The analyzer 102 is a module which analyzes status data stored in the DB 105 and detects a symptom of failure of the HDDs of the client devices 2. The backup manager 103 is a module which determines data transfer between the client devices 2 that should be carried out to back up data in a backup target area in an HDD to other client devices 2 in a distributed manner, if a symptom of failure of the HDD of any of the client devices 2 is detected by the analyzer 102. The client controller 104 is a module which controls the client devices 2 to cause them to carry out data transfer determined by the backup manager 103. The DB 105 is an area in the nonvolatile memory 13 which the backup service program 100 secures for data storage, and stores, for example, data for managing the backup status of data between the client devices 2 as well as status data transmitted from the client devices 2.

In addition, the client controller 104 detects the separation from the network A and the addition (or return) to the network A of the client devices 2. If the client controller 104 detects the separation of any of the client devices 2, the backup manager 103 determines data transfer between the client devices 2 that should be carried out to back up backup data stored in an HDD of the client device 2 to other client devices 2 in a distributed manner. In addition, if the client controller 104 detects the addition (or return) of a client device 2, the backup manager 103 determines data transfer between the client devices 2 that should be carried out to level out a load of backup between the client devices 2. Further, the client controller 104 controls the client devices 2 to cause them to carry out data transfer determined by the backup manager 103.

Figure 7:
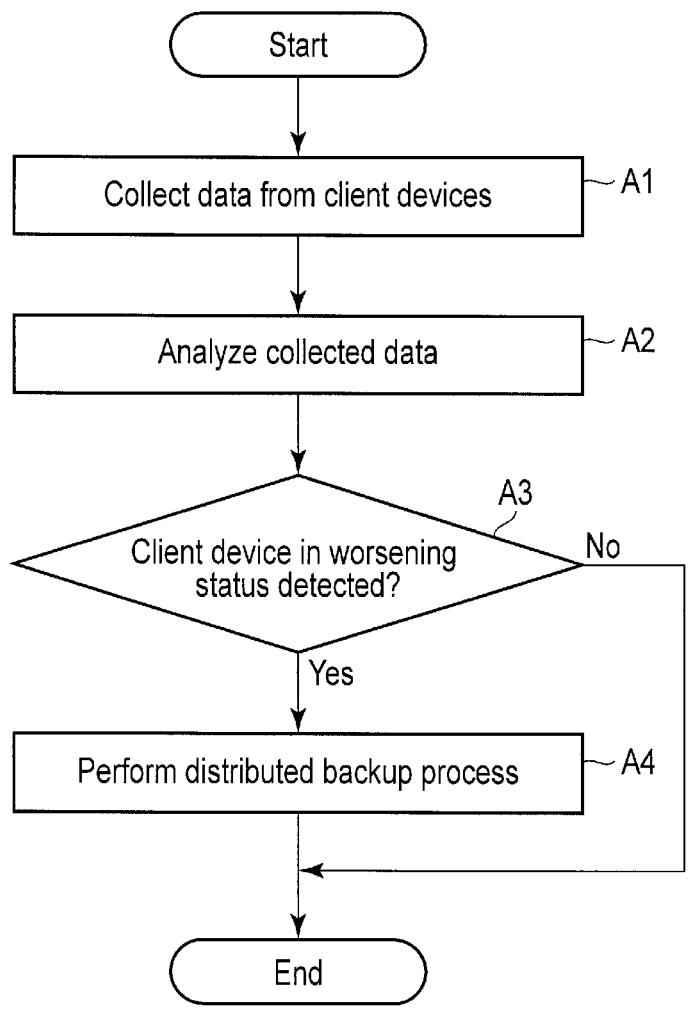
FIG. 7 is an exemplary first flowchart showing an example of an operating procedure related to the backup service of the electronic device of the first embodiment.
Figure 8:
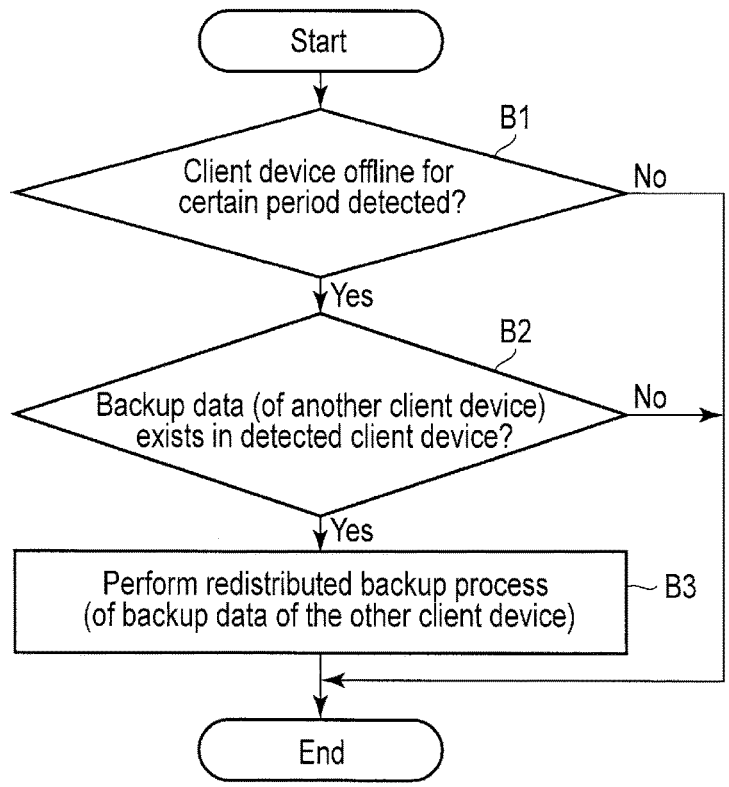
FIG. 8 is an exemplary second flowchart showing an example of the operating procedure related to the backup service of the electronic device of the first embodiment.
Figure 9:
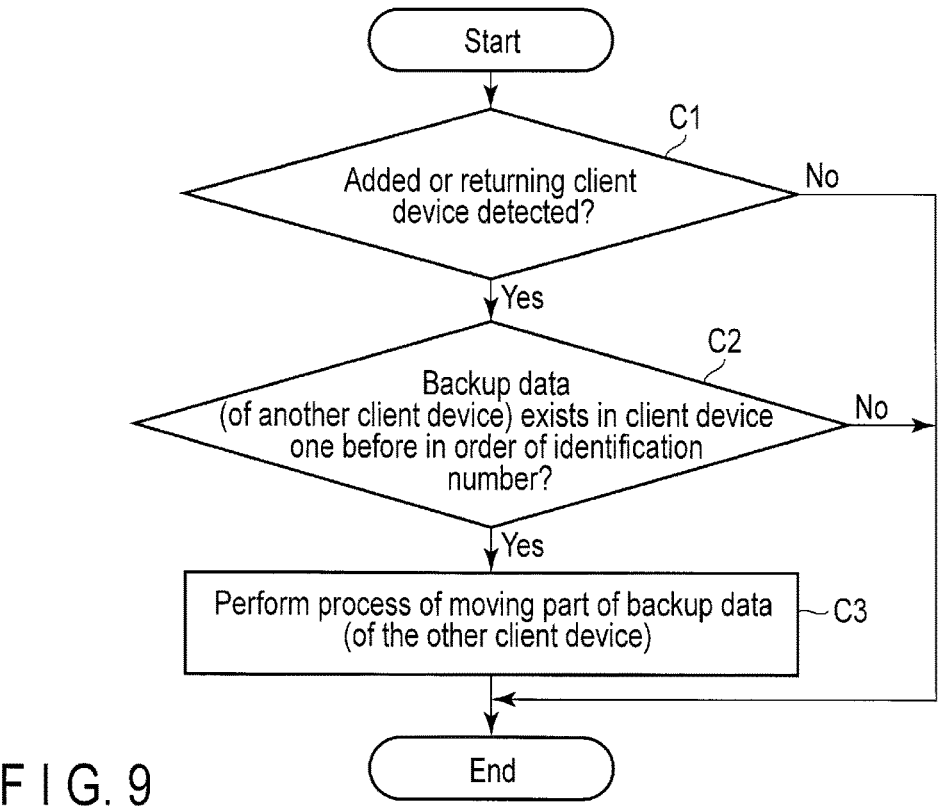
FIG. 9 is an exemplary third flowchart showing an example of the operating procedure related to the backup service of the electronic device of the first embodiment.

FIG. 7, FIG. 8 and FIG. 9 are exemplary flowcharts showing examples of an operating procedure related to the backup service of the server device 1 (backup service program 100).

The server device 1 collects status data transmitted from the client devices 2 (block A1 of FIG. 7), and analyzes the collected status data (block A2 of FIG. 7). If a symptom of failure of an HDD of any of the client devices 2 is detected through the analysis (Yes in block A3 of FIG. 7), the server device 1 performs a process for backing up data in a backup target area in the HDD of the client device 2 to HDDs of two or more other client devices 2 in a distributed manner (block A4 of FIG. 7). It should be noted that the backup target area at this time can include an area where data (backup data) in backup target areas in the HDDs of the other client devices 2 is saved.

In addition, if a client device 2 which is separated from the network A for a certain period or more is detected (Yes in block B1 of FIG. 8), the server device 1 examines whether or not data (backup data) in a backup target area in an HDD of another client device 2 is saved on an HDD of the client device 2 (block B2 of FIG. 8). If the data is saved (Yes in block B2 of FIG. 8), the server device 1 performs a process for backing up the data to HDDs of other client devices 2 in a distributed manner from the HDD of the client device 2 from which the data is backed up (block B3 of FIG. 8).

In addition, if the addition or return to the network A of a client device 2 is detected (Yes in block C1 of FIG. 9), the server device 1 examines whether or not data (backup data) in a backup target area in an HDD of another client device 2 is saved on, for example, a client device 2 one before the client device 2 on the ring (block C2 of FIG. 9). If the data is saved (Yes in block C2 of FIG. 9), the server device 1 performs a process for moving, for example, half the data to the client device 2 (block C3 of FIG. 9).

As described above, the electronic device of the present embodiment achieves backing up data in case of failure of HDDs, etc., mounted in a large number of PCs to be monitored and managed without the need for a storage server and without increasing traffic volume on the network.

Second Embodiment

A second embodiment will be next described.

As in the first embodiment, an electronic device of the present embodiment is also is implemented as, for example, a server device which provides a backup service of data in PCs which employees use for business in a company, etc. Because the structure of the electronic device (server device) of the present embodiment is the same as that of the server device 1 of the first embodiment, an explanation thereof will be omitted. In addition, also in the electronic device (server device) of the present embodiment, a backup service is provided by a backup service program. Because a functional block thereof is the same as that of the backup service program 100 of the first embodiment, an explanation thereof will be omitted. In the following description, the same components, etc., as those of the first embodiment will be given the same numbers as those of the first embodiment. An outline of the backup service provided by the electronic device of the present embodiment will be described with reference to FIG. 10 and FIG. 11.

It is now assumed that a server device 1 (backup service program) detects a symptom of failure of an HDD of a client device 2a. At this time, the server device 1 divides a predesignated area (backup target area) in the HDD into a predetermined number of partial areas. Further, the server device 1 backs up data items in the respective areas in a distributed manner, such that they exist redundantly in HDDs of a predefined number of client devices 2.

For example, if it is assumed that a backup target area is divided into three and each partial area is backed up to two places, the server device 1 searches a ring in order of identification number from the client device 2a (for which a symptom of failure of the HDD is detected), and first backs up data in a partial area [1] to a client device 2b, data in a partial area [2] to a client device 2c, and data in a partial area [3] to a client device 2d. In addition, the server device 1 then backs up data in the partial area [1] to a client device 2e, data in the partial area [2] to the client device 2b, and data in the partial area [3] to the client device 2c. It should be noted that if data in the same partial area is to be backed up to one client device 2 in a process of searching the ring and backing up data in partial areas, the server device 1 skips the client device 2, and backs up data in the partial area to the next client device 2.

Next, with reference to FIG. 11, let us assume that the case where the server device 1 detects a symptom of failure of an HDD of the client device 2b to which data of the client device 2a is backed up or detects that the client device 2b is separated from a network A for a certain period or more.

The server device 1 of the present embodiment also manages a backup status of data between the client devices 2. That is, the server device 1 can recognize that data of the client device 2a is backed up to the client device 2b. Thus, the server device 1 backs up data in the backup target area in the HDD of the client device 2a again, excluding the client device 2b from the ring. In other words, backup data is relocated. If a symptom of failure of the HDD of the client device 2b is detected, the server device 1 also backs up data in a backup target area in the HDD of the client device 2b to client devices 2c, 2d, and 2e (excluding the client devices 2a and 2b from the ring) redundantly and in a distributed manner.

In addition, for example, if the client device 2b returns to the network A, the server device 1 examines whether or not backup data of another client device 2 is saved on, for example, a client device 2 (the client device 2e herein) one before the client device 2b on the ring, of client devices 2 for which a symptom of failure of HDDs is not detected. The server device 1, which manages the backup status of data between the client devices 2, can recognize that data of the client device 2a is backed up to the client device 2e. Thus, the server device 1 backs up data in the backup target area of the HDD of the client device 2a again, adding the client device 2b to the ring. In other words, backup data is relocated. This example thereby returns to the state of FIG. 10.

In this manner, in the present embodiment, the server device 1 achieves backing up data of a client device 2 to two or more other client devices 2 in a distributed manner and further with redundancy by a simple algorithm of dividing a backup target area, searching the ring in order of identification number, and backing up data items in respective partial areas. In addition, backup data is relocated on the occurrence of various events such as the detection of a symptom of failure of an HDD on which backup data of another client device 2 is saved, the detection of the separation from the network A of a client device 2 equipped with an HDD on which data of another client device 2 is saved, and the addition of a new client device 2 to the network 2. Accordingly, the complication of an algorithm related to handling of backup data (accompanying backing up data redundantly) is avoided, and a load of backup is leveled out between the client devices 2 at the same time.

In addition, also in the present embodiment, since data is transmitted and received between the client devices 2 only on the occurrence of various events including the detection of a symptom of failure of an HDD, traffic volume on the network A does not increase.

As described above, the electronic device of the present embodiment achieves backing up data with redundancy in case of failure of HDDs, etc., mounted in a large number of PCs to be monitored and managed without the need for a storage server and without increasing traffic volume on the network.

Various functions disclosed in the embodiments may be each implemented by a processing circuit. Examples of the processing circuit include a programmed processor such as a central processing unit (CPU). The processor executes each of the disclosed functions by executing a program stored in a memory. The processor may be a microprocessor including an electric circuit. The examples of the processing circuit also include a digital signal processor (DSP), an application-specific integrated circuit (ASIC), a microcontroller, a controller, and other electric circuit components.

Because various processes of the embodiments can be implemented by a computer program, the same advantages as those of the embodiments can be easily achieved by installing the computer program in a normal computer through a computer-readable storage medium storing the computer program and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a receiver configured to receive status data periodically transmitted from at least four external devices through a network, the status data indicative of a status of a hard disk drive (HDD) contained in each of the at least four external devices; and
   a processing circuit configured to
      manage the at least four external devices as nodes on a ring,
      analyze the status data,
      backup, when a symptom of failure of a first external device is detected, data in an HDD of the first external device to at least an HDD of a second external device and an HDD of a third external device in a distributed manner, the second external device and the third external device succeeding the first external device on the ring, and
      manage a backup status of the data.

2. The device of claim 1, wherein the processing circuit is configured to:

request the first external device to transmit distributed data generated by dividing the data to the second external device and the third external device; and request the second external device and the third external device to receive and save the distributed data transmitted from the first external device.

3. The device of claim 2, wherein when a symptom of failure of the second external device in which the distributed data of the first external device is backed up is detected, the processing circuit is configured to backup data in the HDD of the second external device to at least the HDD of the third external device and an HDD of a fourth external device in a distributed manner, the third external device and the fourth external device succeeding the second external device on the ring.

4. The device of claim 3, wherein the processing circuit is configured to:

cause the third external device to save one of distributed data generated by dividing data in the HDD of the second external device, and one of re-distributed data generated by dividing the distributed data of the first external device; and cause the fourth external device to save another one of the distributed data of the second external device, and another one of the re-distributed data of the first external device.

5. The device of claim 1, wherein when separation from the network of the second external device in which the distributed data of the first external device is backed up is detected, the processing circuit is configured to backup the distributed data of the first external device in the second external device to at least the HDD of the third external device and an HDD of a fourth external device in a distributed manner, the third external device and the fourth external device succeeding the second external device on the ring.

6. The device of claim 1, wherein when addition to the network of a new external device is detected or when return to the network of a returning external device that has been separated from the network is detected, the processing circuit is configured to cause the detected new or returning external device to save part of distributed data backed up in an HDD of an external device preceding the detected new or returning external device on the ring.

7. A method of an electronic device, the method comprising:

receiving status data periodically transmitted from at least four external devices through a network, the status data indicative of a status of a hard disk drive (HDD) contained in each of the at least four external devices;

managing the at least four external devices as nodes on a ring;

analyzing the status data;

backing up, when a symptom of failure of a first external device is detected, data in an HDD of the first external device to at least an HDD of a second external device and an HDD of a third external device in a distributed manner, the second external device and the third external device succeeding the first external device on the ring; and managing a backup status of the data.

8. The method of claim 7, wherein the backing up the data comprises:

requesting the first external device to transmit distributed data generated by dividing the data to the second external device and the third external device; and requesting the second external device and the third external device to receive and save the distributed data transmitted from the first external device.

9. The method of claim 8, wherein when a symptom of failure of the second external device in which the distributed data of the first external device is backed up is detected, the backing up the data comprises backing up data in the HDD of the second external device to at least the HDD of the third external device and an HDD of a fourth external device in a distributed manner, the third external device and the fourth external device succeeding the second external device on the ring.

10. The method of claim 9, wherein the backing up the data comprises:

causing the third external device to save one of distributed data generated by dividing data in the HDD of the second external device, and one of re-distributed data generated by dividing the distributed data of the first external device; and causing the fourth external device to save another one of the distributed data of the second external device, and another one of the re-distributed data of the first external device.

11. The method of claim 7, further comprising, when separation from the network of the second external device in which the distributed data of the first external device is backed up is detected, backing up the distributed data of the first external device in the second external device to at least the HDD of the third external device and an HDD of a fourth external device in a distributed manner, the third external device and the fourth external device succeeding the second external device on the ring.

12. The method of claim 7, further comprising, when addition to the network of a new external device is detected or when return to the network of a returning external device that has been separated from the network is detected, causing the detected new or returning external device to save part of distributed data backed up in an HDD of an external device preceding the detected new or returning external device on the ring.

* * * * *